Figure 1:
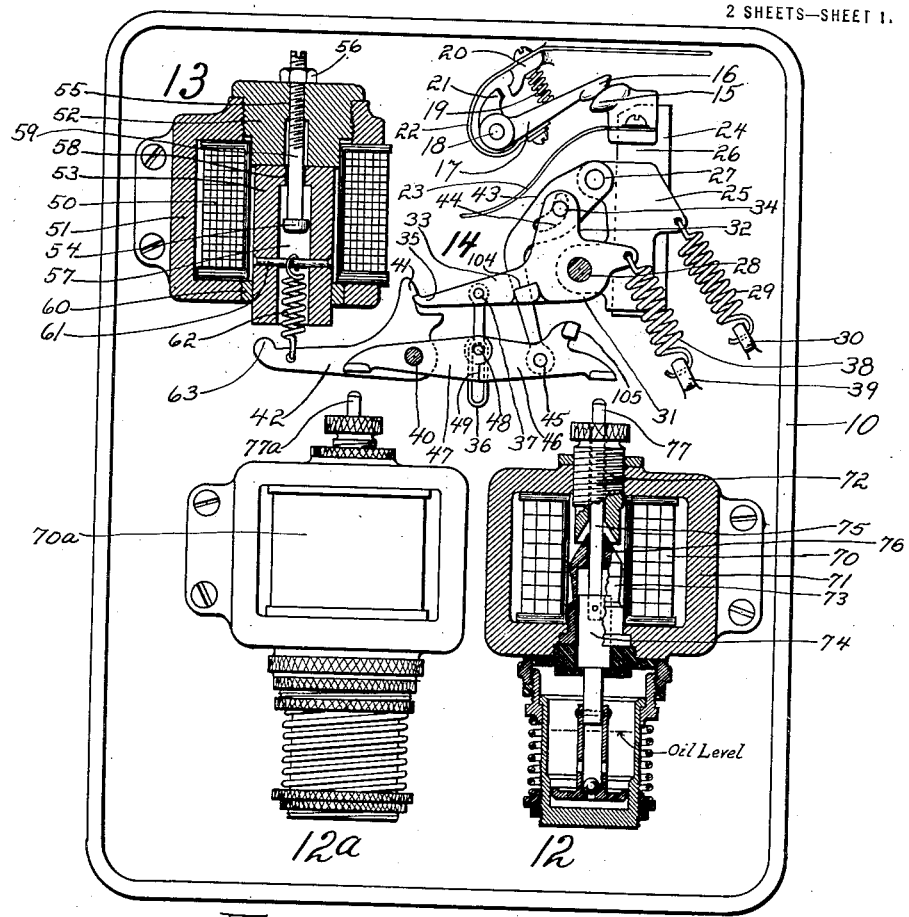

C. H. RIPPL.
PROTECTIVE DEVICE FOR ELECTRIC CIRCUITS.
APPLICATION FILED JULY 6, 1917.

1,292,651.

Patented Jan. 28, 1919.
2 SHEETS—SHEET 1.

INVENTOR.
Charles H. Rippl
BY
ATTORNEY.

C. H. RIPPL.
PROTECTIVE DEVICE FOR ELECTRIC CIRCUITS.
APPLICATION FILED JULY 6, 1917.

1,292,651.

Patented Jan. 28, 1919.
2 SHEETS—SHEET 2.

INVENTOR.
Charles H. Rippl
BY F. N. Barber
ATTORNEY.

UNITED STATES PATENT OFFICE.

CHARLES H. RIPPL, OF CLEVELAND, OHIO, ASSIGNOR TO THE ELECTRIC CONTROLLER & MANUFACTURING COMPANY, OF CLEVELAND, OHIO, A CORPORATION OF OHIO.

PROTECTIVE DEVICE FOR ELECTRIC CIRCUITS.

1,292,651.  Specification of Letters Patent.  Patented Jan. 28, 1919.

Application filed July 6, 1917. Serial No. 178,927.

*To all whom it may concern:*

Be it known that I, CHARLES H. RIPPL, a citizen of the United States, residing at Cleveland, in the county of Cuyahoga and State of Ohio, have invented new and useful Improvements in Protective Devices for Electric Circuits, of which the following is a specification.

This invention relates to protective devices for electric circuits.

It is often desirable to protect electric apparatus, such as an electric motor, or the circuit thereof, from excessive or overload currents, from voltage failure, and from like abnormal conditions in the apparatus or in the supply mains. One well-known custom is to employ for this purpose a plurality of relays, the windings of the relays being energized in a manner to respond respectively to the overload or no-voltage or other abnormal conditions, and the contacts of the relays being arranged to control the energizing winding of an electromagnetic circuit breaker, whereby the apparatus may be disconnected from the supply mains when an abnormal condition arises. When a plurality of such relays is employed, a corresponding multiplicity of the relay control-circuit contacts must be provided. This leads to increased cost and to the necessity for frequent inspection to insure continued operation and continued protection.

One of the objects of this invention, therefore, is to provide a protective device for electric circuits or apparatus in which a plurality of protective relays, such as overload and no-voltage relays, may act in common upon a single set of protective control-circuit contacts, and in which any one or more of the relays may act to operate the protective contacts without interference from others.

Another object is to provide a protective device for electric circuits or apparatus, having a single set of protective control-circuit contacts under the control of a plurality of relays, as above described, and having also manual means for opening or closing the contacts, whereby the device may be employed as a master switch to control the opening and closing of a main line circuit breaker or motor-controlling main-circuit switch or the like.

Another object is to provide in a protective device as above described a means whereby at a time of abnormal electrical conditions in the circuit or apparatus to be protected, the protective control-circuit contacts will automatically be removed from control by the manual means, so that the protective functions of the device cannot be circumvented at the will of the operator.

Other objects will be apparent.

Figure 4:
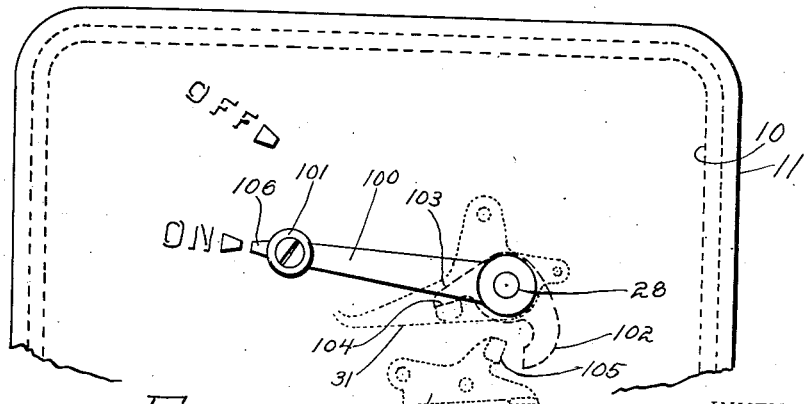
Figure 2:
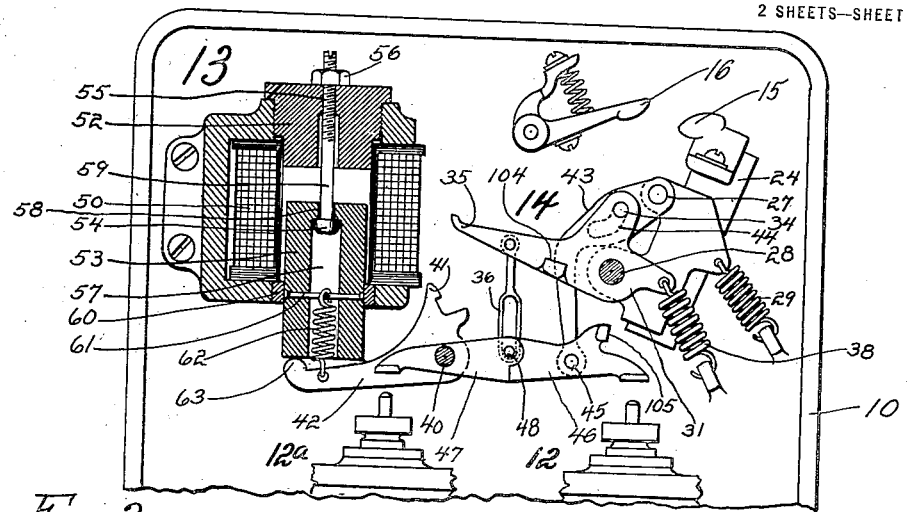
Figure 3:
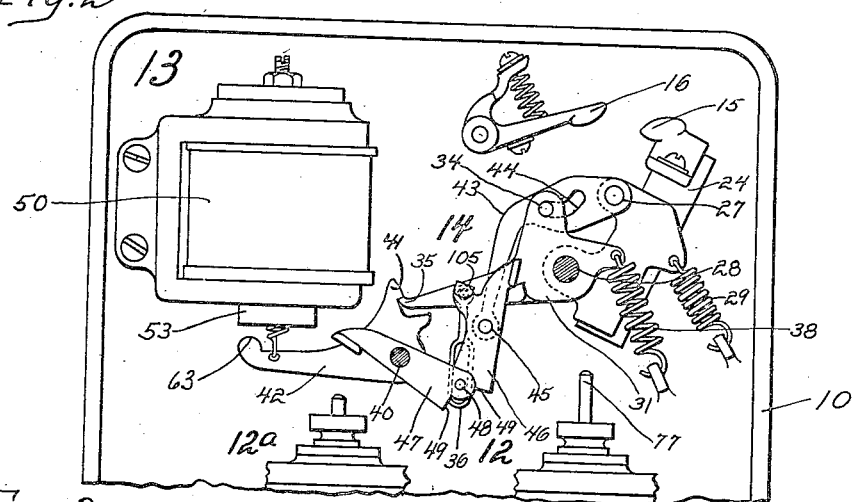

In the accompanying drawings, Figure 1 is a front view, partly in section and partly broken away, of a protective apparatus embodying my invention and having a no-voltage device and two overload devices operating a single set of protective control-circuit contacts, the apparatus being shown in a container with the cover removed and with the operative parts in their "set" position, with the contacts closed; Fig. 2, a view similar to Fig. 1, with some of the parts omitted and showing the operative parts in the position which they assume after the no-voltage device has opened the contacts; Fig. 3, a view similar to Fig. 1, with some of the parts omitted, and showing the operative parts in the position which they assume after one of the overload devices has opened the contacts; Fig. 4, a front view of the upper portion of the apparatus, with the cover on the container, and showing the manually-operated means by which the contacts may be opened or closed; and Fig. 5, a diagram of connections, showing my invention in connection with an electric motor control system.

In the drawings, I have shown at 10 a metal box or container for the apparatus embodying my invention, and at 11 a cover for the same. Mounted upon the rear wall of the box are two similar electromagnetic overload devices 12 and $12^a$ and an electromagnetic no-voltage device 13, these devices being arranged to act through the agency of a mechanism 14 to operate a pair of mutually engageable contacts 15 and 16.

The contact 16 is carried on a relatively stationary switch-arm 17, which is pivoted on a stationary pivot 18. The switch-arm 17 is given a clockwise torque by a compression spring 19 extending from the arm to a fixed stop 20, the clockwise movement being limited by the engagement of a stop 21 on the switch-arm with the fixed stop 20. A flexible conductor 22 (shown in Figs. 1 and 5) is arranged to conduct current from the arm 17 around the pivot 18 to certain connections to be described. The contact 15, having a flexible current conductor 23, is mounted on a movable switch-arm 24 of insulating material. The arm 24 carries the metallic bearing-member 25, spaced below the contact 15 at 26 for insulation purposes. The bearing-member carries a movable pivot 27, and is itself pivotally supported on a stationary pivot 28, so that the pivot 27 and the contact 15 may rotate about the pivot 28. A tension spring 29 connecting the member 25 with a stationary lug 30, gives a continuous clockwise torque to the member 25 and the arm 24.

Pivotally mounted on the stationary pivot 28 is a latch-member 31, having a vertical arm 32 and a horizontal arm 33. The vertical arm 32 carries a pin 34. The horizontal arm 33 terminates in a latch 35 and carries between the latch and the pivot 28 a depending link 36 pivoted to the latch member at 37. The latch member 31 is given a continuous clockwise torque by a tension spring 38 connecting the latch member 31 with a stationary lug 39.

With the parts in their "set" position, shown in Fig. 1, the latch member is prevented from rotating on its pivot 28 by a trigger 42 mounted on a stationary pivot 40 and having on the upper side of the pivot a hook 41 arranged to engage the latch 35. The trigger 42 is given a clockwise torque about the pivot 40 by the no-voltage device 13 in a manner to be described. It is apparent that so long as the hook 41 engages the latch 35, the latch member 31 is prevented from rotating on its pivot 28. With the parts in their "set" position shown in Fig. 1, the switch-arm 24 and the parts mounted thereon are also prevented from rotating under their clockwise torque by the following mechanism: Mounted on the movable pivot 27 is an angular link 43, having a cam-slot 44, arranged to coöperate with the pin 34 on the latch member 31, and having its lower end pivoted at 45 to one member 46 of a toggle. The other member 47 of the toggle is pivoted to the stationary pivot 40, and the two toggle members 46 and 47, are pivoted together at 48. The toggle member 46 is stopped in its clockwise rotation upon the toggle member 47 by stops 49 on the toggle members. It will now be seen that the clockwise torque on the switch-arm 24, produced by the spring 29, tends to move the pivot 27 in the clockwise direction about the pivot 28, and in consequence tends to carry the cam-slot 44 in the clockwise direction around the pivot 28; but the slot by engaging the pin 34 causes the angular link 43 to tend to rotate clockwise upon the pin 34, which gives to the pivot 45 a movement in general toward the stationary pivot 40; but since the force tending to move the pivot 45 toward the pivot 40 is along a line of action below the pivot 48, the toggle members are maintained in their straight or locked position, and movement of the pivot 45 is prevented, and therefore clockwise movement of the arm 24 is prevented.

The contacts 15 and 16, which are locked in their closed position as shown in Fig. 1 and as above described, may be opened either by tripping the toggle members 46 and 47, by either one or both of the overload devices 12 and 12ª, or by tripping the trigger 42 by means of the no-voltage device 13, and these devices and their operation will now be described.

The no-voltage device 13 has the energizing winding 50. Preferably this winding is energized by the voltage of the source of current supply to the electrical circuit or apparatus to be protected, and is fully energized whenever the voltage of the supply is normal. The magnetic circuit energized thereby consists of the main frame 51, the pole piece 52, and the movable plunger 53. When the winding is deënergized, as by failure of supply voltage, the plunger falls and is supported as shown in Fig. 2, on the head 54 of a bolt 59. The bolt is threaded into the pole piece 52 at 55 to make its position adjustable, and is locked at any adjustment by the nut 56. The plunger 53 is bored out at 57 to make a shoulder for the head 54 and is bored out to a smaller diameter at 58 to receive the body of the bolt 59. A nonmagnetic ring 60 prevents the plunger 53 from sticking magnetically to the frame 51. A pin 61, passing diametrically through the plunger, carries one end of a tension spring 62, suspended longitudinally in the bore 57 of the plunger, the lower end of the spring being secured to the trigger 42. The lower end of the plunger, when in its lowermost position, engages a peen 63 on the trigger. With the parts in the position shown in Fig. 1, in which the contacts are closed and the mechanism above described is in its "set" position, if the winding 50 is energized sufficiently, as by full line voltage, the plunger 53 is held in its uppermost position, shown in Fig. 1, and causes the spring 62 to give a clockwise torque to the trigger 42 about the pivot 40, and hold the hook 41 in engagement with the latch 35. When the winding 50 is deënergized, however, as by a failure of line voltage, or is energized with insufficient current to hold the plunger in its upper position, the plunger falls to the position shown in Fig. 2, and the lower end of the plunger strikes the peen 63 of the trigger 42, rotating it counterclockwise into the position shown in Fig. 2, and releasing the latch 35 from the hook 41, whereupon the tension springs 29 and 38 give clockwise torque to the switch-arm 24 and the latch member 31 respectively. These parts then rotate clockwise about the stationary pivot 28 and take the position shown in Fig. 2, separating the contacts 15 and 16. During this movement of the mechanism the toggle members 46 and 47 remain in their locked or straight position.

The overload device 12, shown in cross section in Fig. 1, has the energizing winding 70, preferably energized by the main current flowing in the circuit or apparatus to be protected, the magnetic circuit energized thereby consisting of the main frame 71, the threaded adjustable pole piece 72, a stationary thimble member 73 and a plunger 74. The plunger 74 carries a stem 75 passing upwardly through the closed end 76 of the thimble member and through the pole piece 72, and terminating at 77 adjacent to the end of the toggle member 46. This overload device 12 forms the subject matter of an application filed by me of even date herewith, and a complete description of it and its various functions will be found therein; in this application it is sufficient to say that when the winding 70 is energized with current above a predetermined value, the plunger 74 rises, and the upper end 77 of the stem 75 strikes the toggle member 46, rotating it in the counterclockwise direction about the pivot 45 and breaking the toggle. In a similar manner, if the winding of the overload device 12$^a$ be energized with current above a predetermined value, its stem-end 77$^a$ will rise and strike the end of the toggle member 47, rotating it clockwise about the pivot 40 and breaking the toggle. Again, the devices 12 and 12$^a$ may operate simultaneously, breaking the toggle. When the toggle is broken, as above described, the lower end 45 of the angular link 43 may move to the left and under the action of the tension spring 29, tending to rotate the pivot 27 clockwise about the pivot 28, the link by means of the cam-slot 44 will move about the pin 34, the parts taking up the position shown in Fig. 3, separating the contacts 15 and 16.

As will be described later, the circuit connections of the winding 50 of the no-voltage device 13 are preferably so arranged that the current to this winding flows through the contacts 15 and 16. Therefore, after the parts have assumed the position shown in Fig. 3, due to the action of the overload device 12 or 12$^a$, and the contacts 15 and 16 have separated, the winding 50 becomes de-energized and the plunger 53 falls and trips the trigger 42, releasing the latch 35 and permitting the latch member 31 to rotate in the clockwise direction about the pivot 28. As the member rotates, the depending link 36 picks up the pivot pin 48 and moves the toggle members 46 and 47 to their straight or locked position, and the parts come to rest in the position shown in Fig. 2. It will therefore be seen that, starting with the parts in the position shown in Fig. 1, if they are tripped either by the no-voltage device or by the overload device, the contacts 15 and 16 will be opened and the parts will take the positions shown in Fig. 2.

After the device has operated to open the contacts and the parts have taken the positions shown in Fig. 2, it may be reset to the position shown in Fig. 1, to close the contacts, as follows:

Referring to Fig. 4, which shows the cover 11 on the box 10, I have shown a manually operated arm 100 loosely pivoted on the stationary pivot 28 and having the handle 101 and the fingers 102 and 103. The handle 101 and the arm 100 are on the outside of the cover, while the fingers 103 and 102 are under the cover. The finger 103 is arranged to engage a stop surface 104 on the latch member 31, and the finger 102 is arranged to engage a stop surface 105 on the toggle member 46. The fingers 102 and 103 are shown in Fig. 4 in broken lines, and the latch member 31 and the toggle member 46 are shown in dotted lines. When the parts are in their "set" position with the contacts closed, shown in Fig. 1, the arm 100 is in the position shown in Fig. 4, the finger 103 resting upon the stop 104, and a pointer 106 on the arm 100 indicating the "on" position. When the apparatus is tripped and moves to the position shown in Fig. 2 to open the contacts, the latch member 31, by means of the stop 104 engaging the finger 103, carries the arm 100 clockwise around to the "off" position. To reset the parts from the position shown in Fig. 2 to that shown in Fig. 1, the operator takes hold of the handle and rotates it counterclockwise to the "on" position, the finger 103 by means of the stop 104 rotating the latch member 31 counterclockwise until the contacts 15 and 16 have engaged, the movement of the parts from the position shown in Fig. 2 to that in Fig. 1 to engage the contacts, being just the reverse of that already described in going from Fig. 1 to Fig. 2. The winding of the no-voltage device then receives current through the contacts and its plunger rises, the latch 35 engages the hook 41, and the parts will be held in this position after the operator releases the handle 101.

The apparatus may also be tripped by the operator, if desired, instead of by the overload devices 12 and 12$^a$, or the no-voltage device 13 as follows: The operator moves the arm 100 from the "on" to the "off" position, shown in Fig. 4, whereupon the finger 102 carried by the arm engages the stop 105 on the toggle member 46, and rotates it counterclockwise sufficiently to break the toggle.

If the operator should attempt to set the apparatus and close the contacts 15 and 16, during no-voltage condition of the supply mains, and hence at a time when the winding 50 of the no-voltage device is unenergized, the plunger 53 will remain in its lowermost position and hold the hook 41 out of the path of the latch 35, so that the apparatus will not remain set but will move to the tripped position and open the contacts again when the operator releases his hand from the handle 101, and the arm 100 itself will move to the "off" position.

If the operator attempts to set the apparatus and close the contacts during a current overload condition of the apparatus or circuit to be protected, the overload devices will act and the parts will move into the position shown in Fig. 3, opening the contacts 15 and 16, and causing the no-voltage device to trip the trigger and release the hook 41 from the latch 35; and when the operator releases his hand from the handle 101, the latch member 31 will carry the arm 100 to the "off" position. It will therefore be seen that it is impossible for the operator to set the device under either no-voltage or overload conditions.

Figure 5:
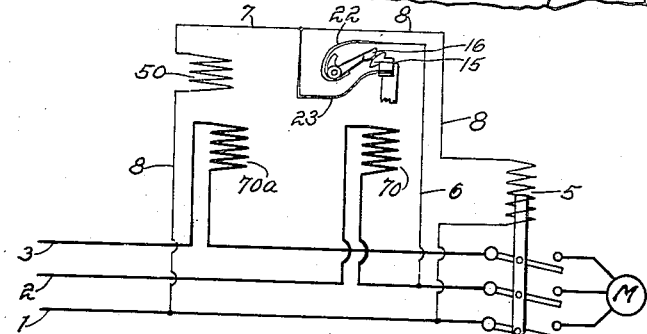

In Fig. 5 I have shown a diagram of connections illustrating the application of my invention to a motor control system, energized by a three-phase alternating current source of supply. The three-phase mains are indicated at 1, 2, and 3. The motor is shown at M. At 4 is a main circuit switch, or 4 may be an electromagnetic motor starter of any suitable form, operated in either case by the electromagnetic winding 5. The contacts 15 and 16 are shown for clearness as of the same form as in the other figures. The windings 70 and 70ª of the overload devices are connected respectively in the supply mains 2 and 3. The circuit of the no-voltage winding 50 may be traced from the supply main through the wire 6, the flexible conductor 22, the contacts 16 and 15, the flexible conductor 23, the wire 7, the winding 50, and the wire 8 to the supply main 1. The circuit of the winding 5 of the main line switch or motor starter may be traced from the supply main 2 through the wire 6, the flexible conductor 22, the contacts 16 and 15, the flexible conductor 23, the wire 8, and the coil 5 to the supply main 1. When the apparatus is in the "set" position, and the contacts 15 and 16 are closed, current from the supply main 2 flows through the contacts to energize both the no-voltage coil and the circuit breaker coil. When the handle 101 is moved to reset the device, the contacts first close and are held closed by the handle, and then the no-voltage coil 50 becomes energized through the contacts and holds the contacts closed through the trigger 42 and the latch member 31. Upon the occurrence of no-voltage or overload conditions against which the motor is to be protected, the contacts 15 and 16 are opened as above described, and the winding 5 being thereby deënergized, the main switch or starter switch 4 opens and disconnects the motor from the line.

While I have elected to describe my invention in connection with an alternating current motor control system, it is obvious that it may have other applications, and while I have illustrated my invention in connection with a no-voltage and two overload devices, it is apparent that my invention may be applicable to the employment of a plurality of relays operating in response to these and other current conditions. While I have shown my invention in connection with an overload device of particular form, it is apparent that overload devices of other forms may be employed without departing from the spirit of my invention. I wish it to be understood that the breadth and scope of my invention as set forth in the appended claims is not to be limited to the exact forms nor to the exact uses disclosed in the specification.

I claim—

1. In a protective apparatus for an electric circuit, an electromagnetic main switch controlling the circuit, a pair of mutually engageable control-circuit contacts, a plurality of electromagnetically operated devices responsive to abnormal conditions in the circuit to be protected, a mechanism whereby any number of the relays may operate the control-circuit contacts, and means whereby the control-circuit contacts are adapted to make and break the energizing circuit of the main switch magnet and one of the relays.

2. In a protective apparatus for an electric circuit, a circuit, a winding for causing the closure of the circuit, a pair of mutually engageable contacts, and a plurality of electromagnetic relays controlling the contacts controlling the winding, one of the relays having a winding in shunt to the circuit to be protected, and having its circuit made and broken on the contacts.

3. In a protective apparatus for an electric circuit, a circuit, a winding for causing the closure of the circuit, a pair of mutually engageable control-circuit contacts, and a plurality of electromagnetic relays controlling the contacts controlling the winding, one of the relays having a winding in shunt to the circuit to be protected, and having its circuit made and broken on the relay contacts.

4. In a protective device for an electric circuit, a no-voltage electromagnetic device, an energizing winding therefor, an overload electromagnetic device, switch contacts, and mechanical means whereby either device may operate the contacts, the circuit of the no-voltage device being made and broken on the contacts.

5. In a protective device for an electric circuit, a no-voltage electromagnetic device, an energizing winding therefor, an overload electromagnetic device, relay contacts, and mechanical means whereby either device may operate the contacts, the circuit of the no-voltage device being made and broken on the contacts.

6. In a protective device for an electric circuit, a plurality of electromagnetic relays responsive to abnormal current conditions in the circuit, a pair of mutually engageable contacts common to the relays, and mechanical means whereby the operation of either relay opens the contacts, the winding of one of the relays being connected in shunt to the circuit to be protected and having its circuit made and broken on the contacts.

7. In a protective device for an electric circuit, a plurality of electromagnetic relays responsive to abnormal current conditions in the circuit, a pair of mutually engageable contacts common to the relays, mechanical means whereby the operation of either relay opens the contacts, the winding of one of the relays being connected in shunt to the circuit to be protected and having its circuit made and broken on the contacts, and manually-operated means for opening the contacts and for closing them only during normal current conditions in the circuit to be protected.

8. In a protective apparatus for an electric circuit, switch contacts, a latch mechanism adapted to be tripped by an electromagnetic device responsive to no-voltage conditions in the circuit, a toggle mechanism adapted to be tripped to operate the contacts by an electromagnetic device responsive to overload conditions in the circuit, means whereby the tripping of the latch resets the toggle, and means for resetting the latch.

9. In a protective apparatus for an electric circuit, switch contacts, a latch mechanism adapted to be tripped by an electromagnetic device responsive to no-voltage conditions in the circuit, a toggle mechanism adapted to be tripped to operate the contacts by an electromagnetic device responsive to overload conditions in the circuit, means whereby the tripping of the latch resets the toggle, and manual means for resetting the latch.

10. In a protective apparatus for an electric circuit, switch contacts, a latch mechanism adapted to be tripped by an electromagnetic device responsive to no-voltage conditions in the circuit, a toggle mechanism adapted to be tripped to operate the contacts by an electromagnetic device responsive to overload conditions in the circuit, means whereby the tripping of the latch resets the toggle, and manual means for resetting the latch and for tripping the toggle.

11. In a protective apparatus for an electric circuit, switch contacts, a no-voltage electromagnetic device and coördinated mechanism responsive to no-voltage conditions in the circuit for operating the contacts, an overload electromagnetic device and coördinated mechanism responsive to overload conditions in the circuit for operating the contacts, means whereby the operation of the overload mechanism operates the no-voltage mechanism, means whereby the operation of the no-voltage mechanism resets the overload mechanism, and means for resetting the no-voltage mechanism.

12. In a protective apparatus for an electric circuit, switch contacts, a no-voltage electromagnetic device and coördinated mechanism responsive to no-voltage conditions in the circuit for operating the contacts, an overload electromagnetic device and coördinated mechanism responsive to overload conditions in the circuit for operating the contacts, whereby the operation of the overload mechanism operates the no-voltage mechanism, means whereby the operation of the no-voltage mechanism resets the overload mechanism, and manual means for resetting the no-voltage mechanism and for operating the overload mechanism.

13. In a protective device for an alternating current circuit, a main switch controlling the circuit, a winding for closing the switch, a pair of mutually engageable control-circuit contacts in the circuit of the winding, a plurality of electromagnetically operated devices responsive to abnormal conditions in the circuit to be protected, a mechanism whereby any number of the relays may open the control-circuit contacts, thereby opening the circuit of the main switch magnet, and means independent of the relays for closing the control-circuit contacts.

Signed at Cleveland, Ohio, this 30th day of June, 1917.

CHARLES H. RIPPL.